(12) United States Patent
Horikoshi

(10) Patent No.: US 11,179,977 B2
(45) Date of Patent: Nov. 23, 2021

(54) TIRE PRESSURE MONITORING SYSTEM, TIRE PRESSURE MONITORING METHOD, TIRE PRESSURE MONITORING PROGRAM, AND VEHICLE

(71) Applicant: BRIDGESTONE CORPORATION, Tokyo (JP)

(72) Inventor: Shotaro Horikoshi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/626,068

(22) PCT Filed: May 25, 2018

(86) PCT No.: PCT/JP2018/020192
§ 371 (c)(1),
(2) Date: Dec. 23, 2019

(87) PCT Pub. No.: WO2019/003745
PCT Pub. Date: Jan. 3, 2019

(65) Prior Publication Data
US 2020/0215859 A1 Jul. 9, 2020

(30) Foreign Application Priority Data

Jun. 26, 2017 (JP) .............................. JP2017-124283

(51) Int. Cl.
*B60C 23/04* (2006.01)
*G01K 7/00* (2006.01)
(Continued)

(52) U.S. Cl.
CPC ...... *B60C 23/0433* (2013.01); *B60C 23/0405* (2013.01); *B60C 23/0486* (2013.01);
(Continued)

(58) Field of Classification Search
USPC ........................................................ 340/447
See application file for complete search history.

(56) References Cited

U.S. PATENT DOCUMENTS

2001/0022551 A1* 9/2001 Barnett ................... B60C 23/20
340/442
2004/0095231 A1* 5/2004 Ichinose ............. B60C 23/0408
340/442
(Continued)

FOREIGN PATENT DOCUMENTS

CN    101520370 A    9/2009
CN    202753706 U    2/2013
(Continued)

OTHER PUBLICATIONS

International Search Report for PCT/JP2018/020192, dated Aug. 7, 2018.
Extended Search Report dated Dec. 7, 2020 from the European Patent Office in Application No. 18 82 4769.6.

*Primary Examiner* — Brent Swarthout
(74) *Attorney, Agent, or Firm* — Sughrue Mion, PLLC

(57) ABSTRACT

A tire pressure monitoring system (30) includes a data acquisition portion (101) that acquires data indicating a tire pressure and a tire temperature of the tire, from a sensor (50FL), a sensor (50FR), a sensor (50RL), and a sensor (50RR) mounted to the tire; a puncture determination portion (103) that determines whether the tire is punctured, based on a puncture determination threshold defined by a relationship between the tire pressure and the tire temperature; and a warning processing portion (105) that generates a warning indicating that the tire is punctured apart from a warning of a drop of the tire pressure when the puncture determination portion (103) determines that the tire is punctured.

11 Claims, 10 Drawing Sheets

(51) Int. Cl.
*G01K 13/00* (2021.01)
*G01L 17/00* (2006.01)
(52) U.S. Cl.
CPC .............. *G01K 7/00* (2013.01); *G01K 13/00* (2013.01); *G01L 17/00* (2013.01)

(56) References Cited

U.S. PATENT DOCUMENTS

| | | | |
|---|---|---|---|
| 2007/0171038 A1* | 7/2007 | Maekawa | B60C 23/0408 340/447 |
| 2012/0080131 A1* | 4/2012 | Teratani | B60C 17/066 152/520 |
| 2013/0274988 A1 | 10/2013 | Reynes | |
| 2015/0239307 A1* | 8/2015 | Horikoshi | B60C 23/0477 340/442 |
| 2015/0375581 A1 | 12/2015 | Serbu et al. | |
| 2017/0040911 A1* | 2/2017 | Tatarchuk | H02K 11/0094 |
| 2019/0092104 A1* | 3/2019 | Ahmed | B60C 23/041 |

FOREIGN PATENT DOCUMENTS

| | | |
|---|---|---|
| CN | 105313612 A | 2/2016 |
| DE | 202014104166 U1 | 10/2014 |
| JP | 2003-072330 A | 3/2003 |
| JP | 2009-248959 A | 10/2009 |
| JP | 2010146297 A | 7/2010 |
| JP | 2014-076748 A1 | 5/2014 |
| WO | 2004/037566 A1 | 5/2004 |

* cited by examiner

FIG. 5A

| SET TIRE TEMPERATURE (Tr) | -10°C | -5°C | 0°C | 5°C | 10°C | 12°C | 15°C | 18°C | 20°C | 25°C | 30°C | 35°C | 40°C |
|---|---|---|---|---|---|---|---|---|---|---|---|---|---|
| CALCULATED TIRE PRESSURE (Pr) | 210.045 | 214.036 | 218.027 | 222.018 | 226.009 | 227.605 | 230. | 232.395 | 233.991 | 237.982 | 241.973 | 245.964 | 249.955 |

FIG. 5B

| SET TIRE TEMPERATURE (Tr) | -10°C | -5°C | 0°C | 5°C | 10°C | 12°C | 15°C | 18°C | 20°C | 25°C | 30°C | 35°C | 40°C |
|---|---|---|---|---|---|---|---|---|---|---|---|---|---|
| REFERENCE VOLUME (Vs, 230kPa) | 1.14413 | 1.16587 | 1.18761 | 1.18761 | 1.23109 | 1.23978 | 1.25283 | 1.26587 | 1.27457 | 1.2963 | 1.31804 | 1.33978 | 1.36152 |

FIG. 6

TIRE PRESSURE (P/Pr, STANDARD SET TIRE PRESSURE = 230 kPa)

| T/Tr Ti | -10°C | -5°C | 0°C | 5°C | 10°C | 12°C | 15°C | 18°C | 20°C | 25°C | 30°C | 35°C | 40°C |
|---|---|---|---|---|---|---|---|---|---|---|---|---|---|
| -10°C | 230 | 234.3701 | 238.7403 | 243.1104 | 247.4805 | 249.2286 | 251.8507 | 254.4727 | 256.2208 | 260.5909 | 264.961 | 269.3312 | 273.7013 |
| -5°C | 225.7114 | 230 | 234.2886 | 238.5773 | 242.8659 | 244.5814 | 247.1546 | 249.7278 | 251.4432 | 255.7319 | 260.0205 | 264.3092 | 268.5978 |
| 0°C | 221.5797 | 225.7899 | 230 | 234.2101 | 238.4203 | 240.1043 | 242.6304 | 245.1565 | 246.8406 | 251.0507 | 255.2608 | 259.471 | 263.6811 |
| 5°C | 217.5966 | 221.7311 | 225.8655 | 230 | 234.1345 | 235.7882 | 238.2689 | 240.7496 | 242.4034 | 246.5378 | 250.6723 | 254.8068 | 258.9412 |
| 10°C | 213.7542 | 217.8156 | 221.8771 | 225.9385 | 230 | 231.6246 | 234.0615 | 236.4983 | 238.1229 | 242.1844 | 246.2458 | 250.3073 | 254.3687 |
| 12°C | 212.255 | 216.2879 | 220.3209 | 224.3538 | 228.3868 | 230 | 232.4198 | 234.8396 | 236.4527 | 240.4857 | 244.5187 | 248.5516 | 252.5846 |
| 15°C | 210.0451 | 214.0361 | 218.0271 | 222.018 | 226.009 | 227.6054 | 230 | 232.3946 | 233.991 | 237.982 | 241.9729 | 245.9639 | 249.9549 |
| 18°C | 207.8808 | 211.8307 | 215.7805 | 219.7304 | 223.6802 | 225.2602 | 227.6301 | 230 | 231.5799 | 235.5298 | 239.4796 | 243.4295 | 247.3794 |
| 20°C | 206.4626 | 210.3855 | 214.3084 | 218.2313 | 222.1542 | 223.7233 | 226.0771 | 228.4308 | 230 | 233.9229 | 237.8458 | 241.7687 | 245.6916 |
| 25°C | 203.0002 | 206.8573 | 210.7144 | 214.5715 | 218.4286 | 219.9715 | 222.2858 | 224.6 | 226.1429 | 230 | 233.8571 | 237.7142 | 241.5714 |
| 30°C | 199.652 | 203.4455 | 207.239 | 211.0325 | 214.826 | 216.3434 | 218.6195 | 220.8956 | 222.413 | 226.2065 | 230 | 233.7935 | 237.587 |
| 35°C | 196.4125 | 200.1444 | 203.8764 | 207.6083 | 211.3403 | 212.833 | 215.0722 | 217.3114 | 218.8042 | 222.5361 | 226.2681 | 230 | 233.7319 |
| 40°C | 193.2764 | 196.9487 | 200.6211 | 204.2935 | 207.9658 | 209.4348 | 211.6382 | 213.8416 | 215.3106 | 218.9829 | 222.6553 | 226.3276 | 230 |

NORMAL

LOW TIRE PRESSURE

PUNCTURE (AIR LEAK)

HIGH TEMPERATURE

TIRE PRESSURE MONITORING SYSTEM, TIRE PRESSURE MONITORING METHOD, TIRE PRESSURE MONITORING PROGRAM, AND VEHICLE

CROSS REFERENCE TO RELATED APPLICATIONS

This application is a National Stage of International Application No. PCT/JP2018/020192 filed May 25, 2018, claiming priority based on Japanese Patent Application No. 2017-124283 filed Jun. 26, 2017.

TECHNICAL FIELD

The present invention relates to a tire pressure monitoring system, a tire pressure monitoring method, a tire pressure monitoring program and a vehicle that monitor a tire pressure of a tire mounted to a vehicle.

BACKGROUND ART

In recent years, a tire pressure monitoring system (TPMS) that monitors a tire pressure (inner pressure) of a tire mounted to a vehicle, is widely adopted. The tire pressure monitoring system warns that the pressure has dropped, when the pressure monitored continuously is below a predetermined threshold. Further, a tire pressure monitoring system that warns that a tire is punctured apart from a warning that the pressure has dropped, is also proposed (see Patent Literature 1).

Specifically, the tire pressure monitoring system disclosed in Patent Literature 1 determines whether the tire is punctured, based on a difference of tire pressures of the tires mounted to the vehicle, and a drop quantity of the pressure from a reference pressure.

CITATION LIST

Patent Literature

[PTL 1] Japanese Unexamined Patent Application Publication No. 2014-076748

SUMMARY OF INVENTION

A main object for warning the puncture by the tire pressure monitoring system is to inform a driver as soon as possible that the tire pressure gradually drops due to the air leak caused by a sharp object such as a nail stuck into the tire (so-called slow puncture) while distinguishing a natural drop of the tire pressure (natural air leak) due to a change of the outer air or the like from the slow puncture.

However, in such a case, since the tire pressure gradually drops, it is difficult to inform the puncture as soon as possible by the determination using the difference of the tire pressures and the drop quantity of the pressure from the reference pressure described above.

Accordingly, an object of the present invention is, in consideration of the problem described above, to provide a tire pressure monitoring system, a tire pressure monitoring method, a tire pressure monitoring program and a vehicle capable of precisely detecting a puncture, which is caused by leak of air filled in a tire, as soon as possible while distinguishing a natural drop of a tire pressure, which is caused by a change of an outer air temperature or the like, from the puncture.

One aspect of the present invention is a tire pressure monitoring system (tire pressure monitoring system 30) that monitors a tire pressure of a tire (tire 20FL, tire 20FR, tire 20RL and tire 20RR) mounted to a vehicle (for example, vehicle 10). The tire pressure monitoring system includes a data acquisition portion (data acquisition portion 101) that acquires data indicating the tire pressure (tire pressure P) and a tire temperature (tire temperature T) of the tire, from a sensor (sensor 50FL, sensor 50FR, sensor 50RL and sensor 50RR) mounted to the tire, a puncture determination portion (puncture determination portion 103) that determines whether the tire is punctured, based on a puncture determination threshold (puncture determination threshold $P_{TH}$) defined by a relationship between the tire pressure and the tire temperature, and a warning processing portion (warning processing portion 105) that generates a warning indicating that the tire is punctured apart from a warning of a drop of the tire pressure, when the puncture determination portion determines that the tire is punctured.

Other aspect of the present invention is a tire pressure monitoring system (tire pressure monitoring system 30) that monitors a tire pressure of a tire (tire 20FL, tire 20FR, tire 20RL and tire 20RR) mounted to a vehicle (for example, vehicle 10). The tire pressure monitoring system includes a data acquisition portion (data acquisition portion 101) that acquires data indicating the tire pressure (tire pressure P) and a tire temperature (tire temperature T) of the tire, from a sensor (sensor 50FL, sensor 50FR, sensor 50RL and sensor 50RR) mounted to the tire, and a puncture determination portion puncture determination portion 103) that determines whether the tire is punctured, based on a puncture determination threshold (puncture determination threshold $P_{TH}$) defined by reference volume (reference volume Vs) calculated by using a reference tire pressure (reference tire pressure Ps) and a reference tire temperature (reference tire temperature Ts). The puncture determination portion determines that the tire is punctured, when the tire pressure is less than the tire puncture determination threshold linked to the tire temperature.

Other aspect of the present invention is a tire pressure monitoring method that monitors a tire pressure of a tire mounted to a vehicle. The tire pressure monitoring method includes acquiring data indicating the tire pressure and a tire temperature of the tire, from a sensor mounted to the tire, determining whether the tire is punctured, based on a puncture determination threshold defined by a relationship between the tire pressure and the tire temperature, and generating a warning indicating that the tire is punctured apart from a warning of a drop of the tire pressure, when the puncture determination portion determines that the tire is punctured.

Other aspect of the present invention is a tire pressure monitoring method that monitors a tire pressure of a tire mounted to a vehicle. The tire pressure monitoring method includes acquiring data indicating the tire pressure and a tire temperature of the tire, from a sensor mounted to the tire, and determining whether the tire is punctured, based on a puncture determination threshold defined by reference volume calculated by using reference tire pressure and reference tire temperature. The determining whether the tire is punctured includes determining that the tire is punctured, when the tire pressure is less than the tire puncture determination threshold linked to the tire temperature.

Other aspect of the present invention is a tire pressure monitoring program that monitors a tire pressure of a tire mounted to a vehicle. The tire pressure monitoring program causes a computer to execute a process that acquires data indicating the tire pressure and a tire temperature of the tire, from a sensor mounted to the tire, a process that determines whether the tire is punctured, based on a puncture determination threshold defined by a relationship between the tire pressure and the tire temperature, and a process that generates a warning indicating that the tire is punctured apart from a warning of a drop of the tire pressure, when the puncture determination portion determines that the tire is punctured.

Other aspect of the present invention is a tire pressure monitoring program that monitors a tire pressure of a tire mounted to a vehicle. The tire pressure monitoring program causes a computer to execute a process that acquires data indicating tire pressure and tire temperature of the tire, from a sensor mounted to the tire, and a process that determines whether the tire is punctured, based on a puncture determination threshold defined by reference volume calculated by using reference tire pressure and reference tire temperature. The process that determines whether the tire is punctured determines that the tire is punctured, when the tire pressure is less than the tire puncture determination threshold linked to the tire temperature.

Another aspect of the present invention is a vehicle having the tire pressure monitoring system described above.

BRIEF DESCRIPTION OF DRAWINGS

FIG. 5A is a table illustrating one example of a relationship between a set tire temperature Tr and a calculated tire pressure Pr ($P_{t^\circ C.}$) (a reference tire temperature Ts is 15° C. and a reference tire pressure Ps is 230 kPa).

FIG. 5B is a table illustrating one example of a relationship between the set tire temperature Tr and a reference volume Vs (the reference tire pressure Ps is 230 kPa).

FIG. 6 is a table illustrating a relationship between a tire temperature T and a tire pressure P measured by a sensor, and a relationship between the set tire temperature Tr and the calculated tire pressure Pr.

DESCRIPTION OF EMBODIMENTS

Hereinafter, embodiments will be described with reference to the drawings. The same reference signs or similar reference signs are assigned to the same functions or the same components and the description thereof is omitted as needed.

Figure 1:
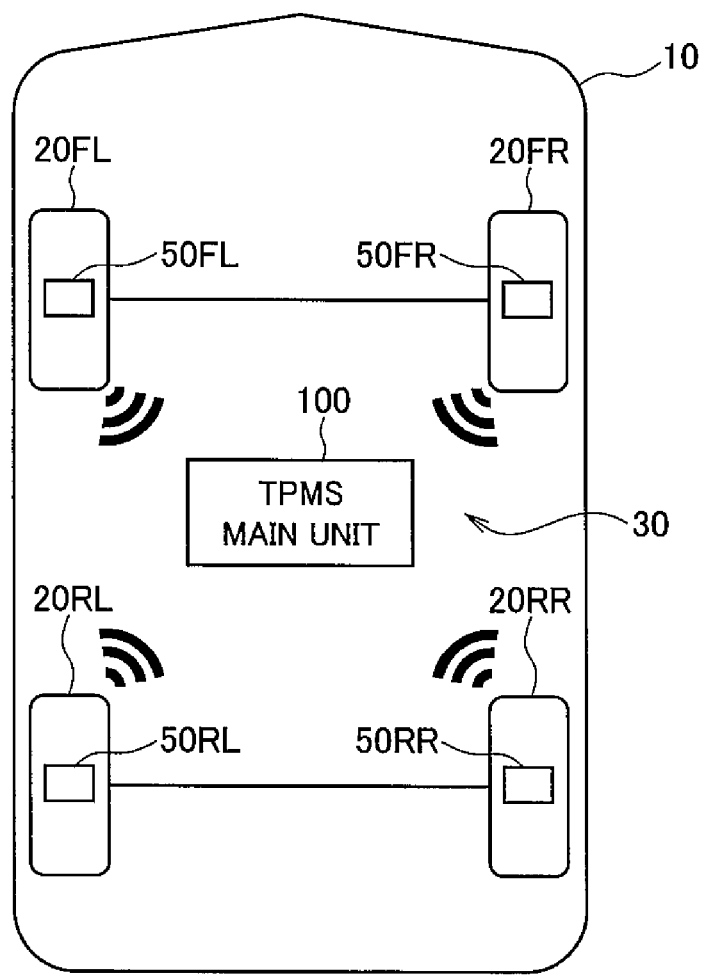
FIG. 1 is a schematic plane view of a vehicle 10 including a tire pressure monitoring system 30.

(1) Schematic Configuration of Vehicle Including Tire Pressure Monitoring System FIG. 1 is a schematic plane view of a vehicle 10 including a tire pressure monitoring system 30. As shown in FIG. 1, the vehicle 10 is a car having a four wheel. A type of the vehicle 10 is not especially limited, and therefore the vehicle 10 may be formed as a passenger vehicle, a truck, a bus or a mine vehicle. As described below, a rear wheel may be formed as a double tire.

A tire 20FL, a tire 20FR, a tire 20RL, and a tire 20RR are mounted to respective wheel positions in the vehicle 10. Each of the tire 20FL, the tire 20FR, the tire 20RL, and the tire 20RR is formed as a tire mounted to a wheel rim (it may be called a tire wheel assembly).

The tire 20FL, the tire 20FR, the tire 20RL, and the tire 20RR are mounted to a left front wheel, a right front wheel, a left rear wheel, and a right rear wheel, respectively.

The tire pressure monitoring system 30 monitors a tire pressure of the tire mounted to the vehicle 10. The tire pressure monitoring system 30 is also called a TPMS. The tire pressure monitoring system 30 is formed by a sensor mounted to each tire, and a TPMS main unit 100. The TPMS main unit 100 may be installed as a part of an electronic control unit (ECU) mounted to the vehicle 10.

A sensor 50FL that measures the pressure (inner pressure) and the temperature of the tire 20FL is mounted to the tire 20FL. Similarly, a sensor 50FR, a sensor 50RL, and a sensor 50RR are mounted to the tire 20FR, the tire 20RL, and the tire 20RR, respectively. Specifically, each of the sensors is mounted to a rim wheel to which the tire is mounted, a valve, or an inner surface of the tire.

The TPMS main unit 100 is arranged in the vehicle 10 so as to receive a radio signal (radio wave) transmitted by the sensor 50FL, the sensor 50FR, the sensor 50RL, and the sensor 50RR.

(2) Functional Block Configuration of Tire Pressure Monitoring System

Figure 2:
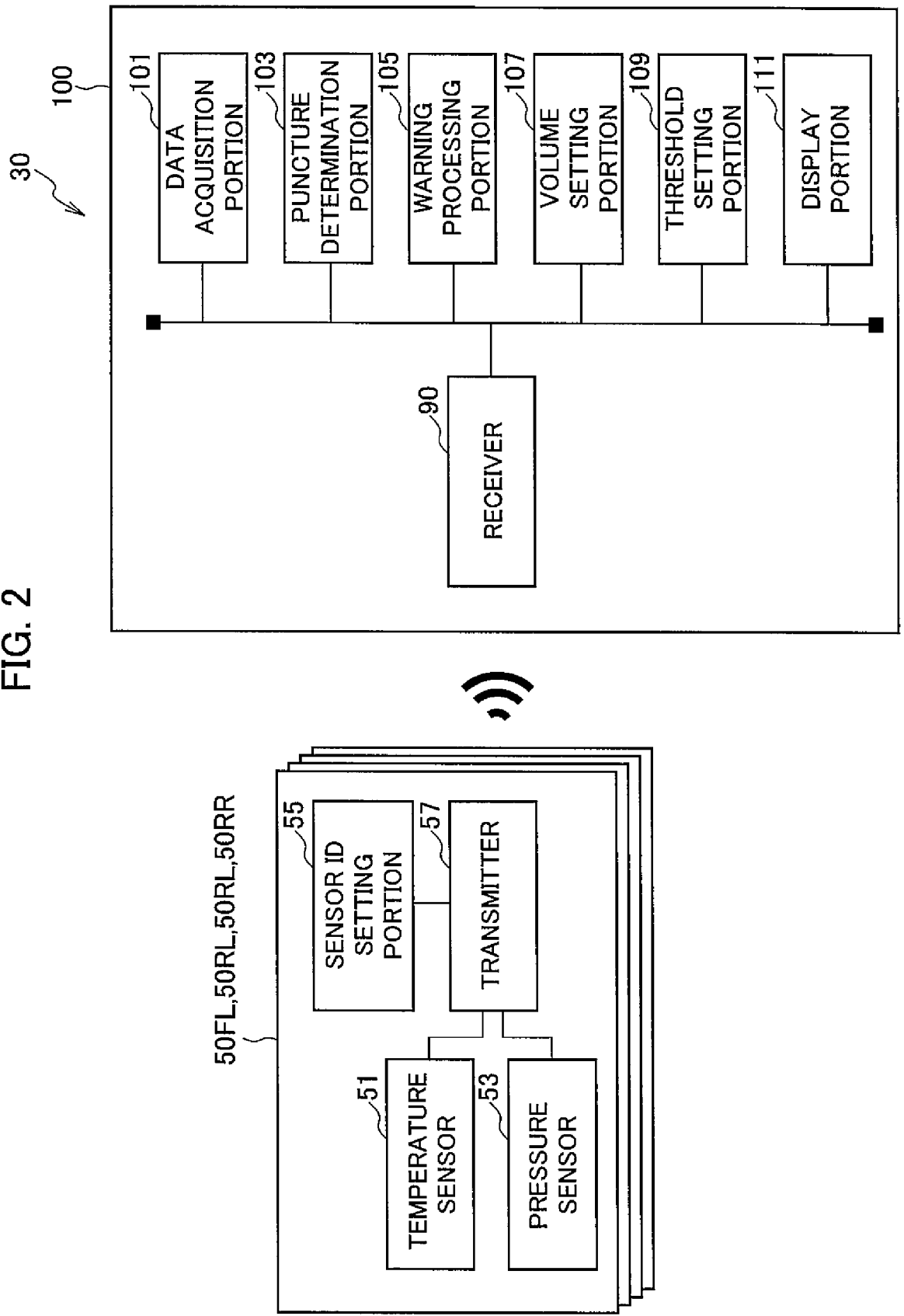
FIG. 2 is a functional block diagram of the tire pressure monitoring system 30.

Next, a functional block configuration of the tire pressure monitoring system 30 will be described. FIG. 2 is the functional block diagram of the tire pressure monitoring system 30. As shown in FIG. 2, the tire pressure monitoring system 30 is provided with the sensors (sensor 50FL, sensor 50FR, sensor 50RL, and sensor 50RR) mounted to respective wheel positions, and the TPMS main unit 100.

(2. 1) Sensor 50FL (Sensor 50FR, Sensor 50RL and Sensor 50RR)

The sensor 50FL (sensor 50FR, sensor 50RL, and sensor 50RR are the same) has a temperature sensor 51, a pressure sensor 53, a sensor ID setting portion 55, and a transmitter 57. Hereinafter, the sensor 50FL is exemplarily described.

The temperature sensor 51 measures a temperature (tire temperature) in an air chamber of the tire 20FL mounted to the rim wheel. For example, a semiconductor type sensor is adopted as the temperature sensor 51.

The pressure sensor 53 measures a pressure (inner pressure: hereinafter, tire pressure) in the air chamber of the tire 20FL. For example, an electrostatic type sensor is adopted as the pressure sensor 53.

Measurement accuracy of each of the temperature sensor 51 and the pressure sensor 53 may be changed depending on the temperature in the air chamber of the tire 20FL. Further, the sensor 50FL may include a sensor that measures acceleration.

The sensor ID setting portion 55 sets a sensor ID that identifies the sensor 50FL. Specifically, the sensor ID setting portion 55 stores identifier information of the sensor 50FL and provides the stored identifier information to the transmitter 57. As the identifier information, data of 2 bits may be adopted. In a case in which much more information (tire type or the like) is included, data of much more bits may be adopted. The identifier information is multiplexed into the radio signal transmitted by the transmitter 57.

The transmitter 57 transmits the radio signal (radio wave) in which the data indicating the measured temperature output from the temperature sensor 51 and the data indicating the measured pressure (tire pressure) output from the pressure sensor 53 are multiplexed, to the TPMS main unit 100.

(2. 2) TPMS Main Unit 100

The TPMS main unit 100 is provided with a receiver 90, a data acquisition portion 101, a puncture determination portion 103, a warning processing portion 105, a volume setting portion 107, a threshold setting portion 109, and a display portion 111.

The receiver 90 receives the radio signal transmitted by the transmitter 57. The intensity (transmission power) and a use frequency band of the radio signal may be changed depending on a use area of the tire pressure monitoring system 30 or a type of the vehicle 10. Further, the receiver 90 may be arranged separately from the TPMS main unit 100.

The data acquisition portion 101 acquires data indicating the tire pressure and the tire temperature from the sensor 50FL, the sensor 50FR, the sensor 50RL, and the sensor 50RR. Specifically, the data acquisition portion 101 acquires the data indicating the tire pressure and the tire temperature output by the receiver 90, for each sensor.

The puncture determination portion 103 determines whether each of the tire 20FL, the tire 20FR, the tire 20RL, and the tire 20RR is punctured. Specifically, the puncture determination portion 103 determines whether each of the tire 20FL, the tire 20FR, the tire 20RL, and the tire 20RR is punctured, based on a puncture determination threshold $P_{TH}$.

Hereinafter, a cause of a change of the tire pressure is described. The cause of the change of the pressure in the tire (tire 20FL, tire 20FR, tire 20RL, and tire 20RR) is (i) a change of an outer air temperature, (ii) a change of the temperature due to heat generation of the tire or the like in association with travelling, (iii) natural air leak, and (iv) air leak due to a puncture caused by a nail, failure of an air valve, or a crack of the rim wheel (namely, an external factor).

That is, the drop (air leak) of the tire pressure (tire inner pressure) is caused by the natural air leak or the external factor. In the present embodiment, the change of the tire inner volume is focused on in order to determine the puncture (especially, slow puncture).

The tire inner volume is represented as below based on the Boyle-Charles' law.

Tire inner volume ($V$)=Coefficient ($k$)×Tire temperature ($T$)/Tire inner pressure ($P$)

Here, when the tire inner volume determined in advance as a reference is set as a reference volume Vs, the tire inner volume V is largely changed due to generation of the leak of the air in the tire. In the present embodiment, the generation of the puncture is determined as soon as possible by using the change of the tire inner volume V described above.

The puncture determination portion 103 determines whether the tire is punctured, based on the puncture determination threshold $P_{TH}$ defined by a relationship between the tire pressure P and the tire temperature T measured by the sensor 50FL, the sensor 50FR, the sensor 50RL and the sensor 50RR.

Specifically, the puncture determination portion 103 determines whether the tire is punctured, based on the puncture determination threshold $P_{TH}$ defined by the reference volume Vs calculated by using the reference tire pressure Ps and the reference tire temperature Ts.

The reference tire pressure Ps denotes the tire pressure defined in advance as a reference and generally corresponds to a standard tire pressure of the vehicle 10. The reference tire temperature Ts denotes the tire temperature defined in advance as a reference and generally corresponds to an outer air temperature when the tire pressure is adjusted (before travelling).

The reference tire pressure Ps and the tire pressure P may be corrected by using a correction coefficient $k_P$ corresponding to at least one of the measurement accuracy of the sensor and the type (including a size) of the tire. That is, the reference tire pressure Ps and the tire pressure P are defined by using the correction coefficient $k_P$.

Similarly, the reference tire temperature Ts and the tire temperature T may be also corrected by using a correction coefficient $k_T$ corresponding to at least one of the measurement accuracy of the sensor and the type (including a size) of the tire. That is, the reference tire temperature Ts and the tire temperature T are defined by using the correction coefficient $k_T$.

A variation range of the reference volume Vs is defined by using these values, and thereby the drop of the tire pressure P due to an influence of the temperature change and the air leak due to the puncture can be determined with higher accuracy.

By using the reference tire pressure Ps, the reference tire temperature Ts, the tire pressure P, the tire temperature T, the correction coefficient $k_T$ for the tire temperature T, and the correction coefficient $k_P$ for the tire pressure P, based on the Boyle-Charles' law, Formula 1

$$Vs = \frac{Ts}{Ps} = \frac{(273.15 + T + k_T)}{(P + k_P)} \quad \text{equation 1}$$

the reference volume Vs is calculated.

The tire pressure P and the tire temperature T are an actual tire pressure and an actual tire temperature measured by the sensor 50FL, the sensor 50FR, the sensor 50RL, and the sensor 50RR.

Further, the calculated tire pressure Pr, which is the tire pressure at the set tire temperature Tr and is calculated by using the reference volume Vs, is represented as below.

Formula 2

$$Pr = \frac{Tr}{Vs} = \frac{(273.15 + T + k_T)}{Vs} \quad \text{equation 2}$$

The set tire temperature Tr is a tire temperature (for example, −10° C. to 40° C.) in a temperature range of the tire 20FL, the tire 20FR, the tire 20RL and the tire 20RR in a normal use environment and corresponds to the calculated tire pressure Pr.

Specifically, the calculated tire pressure Pr at the set tire temperature Tr is calculated by inputting a temperature change condition, namely the set tire temperature Tr, into the equation 2. For example, in a case in which the reference tire temperature Ts is 15° C. and the set tire temperature Tr is 5° C., the calculated tire pressure Pr ($P_{5° C.}$) is calculated as below.

Formula 3

$$P_{5° C.} = \frac{273.15 + 5}{1.252826} = 222.018$$

Here, the reference volume Vs (1.252826) is calculated by the equation 1 as the reference tire temperature Ts is 15° C. and the reference tire pressure Ps is 230 kPa (the correction coefficient $k_T$ and the correction coefficient $k_P$ are not applied). In the present embodiment, as shown in FIG. 5A, an equation for determining the puncture is defined based on the calculated tire pressures Pr ($P_{t° C.}$) corresponding to the set tire temperatures Tr.

FIG. 5A is a table illustrating one example of a relationship between the set tire temperature Tr and the calculated tire pressure Pr ($P_{t° C.}$) (the reference tire temperature Ts is 15° C. and the reference tire pressure Ps is 230 kPa).

According to the set tire temperature Tr and the calculated tire pressure Pr shown in FIG. 5A, the relationship between Tr and Pr is represented by a linear equation. However, a predetermined coefficient (α, β or the like described below) may be applied to Tr and Pr. Further, as described below, in a case in which the measurement error of the sensor is corrected, the equation may be not the linear equation but an nth-degree equation.

That is, the puncture determination portion 103 may determines whether the tire is punctured, by using at least one of the tire pressure in which the measurement error of the sensor is corrected (the tire pressure P or the calculated tire pressure Pr (specifically, $Pr^x$)), and the tire temperature in which the measurement error of the sensor is corrected (the tire temperature T or the set tire temperature Tr). Specifically, the puncture determination portion 103 may determine whether the tire pressure in which the measurement error is corrected is less than the puncture determination threshold $P_{TH}$ linked to the tire temperature.

As described above, the tire pressure P and the tire temperature T to be measured are changed due to the travelling or in accordance with the change of the outer air temperature. Accordingly, the puncture determination portion 103 determines that the tire is punctured, when the tire pressure P measured by the sensor 50FL, the sensor 50FR, the sensor 50RL and the sensor 50RR is less than the puncture determination threshold $P_{TH}$ linked to the tire temperature T at the measurement timing.

Specifically, the puncture determination portion 103 determines whether the tire is punctured, based on the equation 3.

Formula 4

$$P \le P_{TH}$$

$$P_{TH} = \alpha \times P_r^x + (\beta + k_p) \quad \text{equation 3}$$

Here, $Pr^x$ is the calculated tire pressure Pr corresponding to the set tire temperature Tr, and the relationship between Tr and Pr may be not a linear equation but an nth-degree equation. α is a temperature coefficient of the equation, and β is a pressure coefficient of the equation. α and β are coefficients that correct the set reference tire pressure Ps, the set reference tire temperature Ts, and measurement error (instrumental error) of each sensor.

Further, the puncture determination portion 103 may determine whether the air leak of the tire is not generated, based on the change of the tire pressure P of each of the tire 20FL, the tire 20FR, the tire 20RL, and the tire 20RR after filling air.

For example, in a case in which although the puncture of the tire is repaired by using a tire puncture emergency repair kit that fills the puncture repair liquid in the tire, the puncture is not completely repaired, the tire inner volume V gradually drops, and thereby the tire pressure P to be measured is changed. The drop of the tire pressure P in such a case is very small as described below, however the puncture determination portion 103 can determine the presence of the puncture based on the change of the tire inner volume V.

The warning processing portion 105 generates a warning indicating that the tire is punctured apart from the drop of the tire pressure P, when the puncture determination portion 103 determines that one or more of the tire 20FL, the tire 20FR, the tire 20RL, and the tire 20RR are punctured.

In particular, the warning processing portion 105 generates the warning indicating that the tire is punctured apart from the warning due to the drop of the tire pressure P (the warning based on a tire pressure drop threshold), when the puncture determination portion 103 determines that one or more of the tire 20FL, the tire 20FR, the tire 20RL, and the tire 20RR are punctured. Specifically, the warning processing portion 105 generates the warning indicating that the tire is punctured at an earlier stage than the warning that is based on the tire pressure drop threshold.

Further, the warning processing portion 105 generates a warning indicating that the temperature is increased, when the tire temperature T reaches a tire temperature warning threshold.

Specifically, the warning processing portion 105 generates the warnings (or shows no warning generated) shown in FIG. 7A to FIG. 7D.

FIG. 7A to FIG. 7D show image examples of a state of the tire displayed by the TPMS main unit 100. As shown in FIG. 7A to FIG. 7D, the warning processing portion 105 displays either of "Normal" (in a case in which the drop of the tire pressure and the puncture are not generated), "Low tire pressure", and "Puncture (air leak)" on the display portion 111. Further, the warning processing portion 105 may display "High temperature" on the display portion 111.

Here, in a case in which "Low tire pressure", "Puncture (air leak)", or "High temperature" is displayed on the display portion 111, a warning sound may be output at the same time. Further, an operation flow for displaying is further described below.

The volume setting portion 107 sets the reference volume Vs. Specifically, the volume setting portion 107 sets the reference volume Vs based on the tire pressure P and the tire temperature T of the normal tire without air leak.

That is, the volume setting portion 107 calculates the reference volume Vs corresponding to the tire pressure P at the tire temperature T, based on the tire pressure P and the tire temperature T measured by the sensor 50FL, the sensor 50FR, the sensor 50RL, and the sensor 50RR. The reference volume Vs is calculated by using the equation 1 described above. In this case, the measured tire pressure P and the measured tire temperature T are applied to the reference tire pressure Ps and the reference tire temperature Ts of the equation 1.

Here, FIG. 5B shows one example of a relationship between the set tire temperature Tr and the reference volume Vs (the reference tire pressure Ps is 230 kPa). As shown in FIG. 5B, when the set tire temperature Tr is increased, the reference volume Vs is increased, and when the set tire temperature Tr is decreased, the reference volume Vs is decreased.

FIG. 6 shows a relationship between the tire temperature T and the tire pressure P measured by the sensor, and a relationship between the set tire temperature Tr and the calculated tire pressure Pr.

In FIG. 6, a horizontal direction (row direction) denotes the measured tire temperature T (corresponding to the outer air temperature) or the set tire temperature Tr, and a vertical direction (column direction) denotes a tire temperature Ti when air is filled to be the standard set tire pressure (230 kPa). FIG. 6 includes one example of the relationship between the set tire temperature Tr and the calculated tire pressure Pr ($P_{t° C}$) shown in FIG. 5A (the reference tire temperature Ts is 15° C. and the reference tire pressure Ps is 230 kPa).

As shown in FIG. 6, in a case in which the tire temperature T (or the set tire temperature Tr) is changed from the tire temperature Ti when air is filled, the tire pressure P based on the reference volume Vs (or the calculated tire pressure Pr) is changed as shown by cells in FIG. 6. In the actual environment, the tire pressure shown in each cell is used as the calculated tire pressure Pr, which is a basis of the puncture determination threshold $P_{TH}$.

For example, when the tire temperature T is decreased to 5° C., the calculated tire pressure Pr to be the basis is 222.018 kPa as described above. While, for example, when the tire temperature T is increased to 30° C., the calculated tire pressure Pr to be the basis is 241.9279 kPa (=(273.15+30)/1.252826).

That is, when the measured tire temperature T is decreased to be less than the set tire temperature Tr, the tire pressure P is decreased, and when the measured tire temperature T is increased to be more than the set tire temperature Tr, the tire pressure P is increased.

The volume setting portion 107 sets the reference volume Vs based on the tables as shown in FIG. 5B and FIG. 6 and determines a relationship between the set reference volume Vs and the tire temperature T (the set tire temperature Tr).

Here, the volume setting portion 107 may store the table as shown in FIG. 5B or FIG. 6, or alternatively the volume setting portion 107 may calculate the reference volume Vs or the like by using the equation 1 and the equation 2 described above. Further, the change of the tire pressure P corresponding to the change of the tire temperature T may be calculated by using an equation (a linear equation) as described above.

The threshold setting portion 109 sets the puncture determination threshold $P_{TH}$. Specifically, the threshold setting portion 109 sets the puncture determination threshold $P_{TH}$ linked to the reference volume Vs set by the volume setting portion 107.

More specifically, the threshold setting portion 109 sets the puncture determination threshold $P_{TH}$ based on the equation 3 described above. It is preferable that the puncture determination threshold $P_{TH}$ is set to be 0.8 or more of the calculated tire pressure Pr (the reference tire pressure) linked to the set tire temperature Tr (the reference tire temperature), and 0.95 or less of the calculated tire pressure Pr. Further, it is preferable that the puncture determination threshold $P_{TH}$ is set to be more than the tire pressure drop threshold (for example, 0.8 or less of the standard set tire pressure) used for determining the drop of the tire pressure P.

With this, the puncture can be determined at an earlier stage than the drop of the tire pressure P due to the natural air leak.

Further, the threshold setting portion 109 may set the warning threshold (tire temperature warning threshold) against the tire temperature T. The threshold setting portion 109 informs the set tire temperature warning threshold to the warning processing portion 105.

The display portion 111 displays the image shown in FIG. 7A to FIG. 7D in accordance with the instruction of the warning processing portion 105. Specifically, the display portion 111 includes a display such as a liquid crystal panel so as to display the image shown in FIG. 7A to FIG. 7D on the display. Here, the display portion 111 may be formed by an independent display or may be formed to use a display of other device mounted to the vehicle 10.

(3) Operation of Tire Pressure Monitoring System

Next, operation of the tire pressure monitoring system 30 described above will be described. Specifically, an initial setting operation, and a puncture and tire pressure drop detection operation of the tire pressure monitoring system 30 will be described.

(3. 1) Initial Setting Operation

Figure 3:
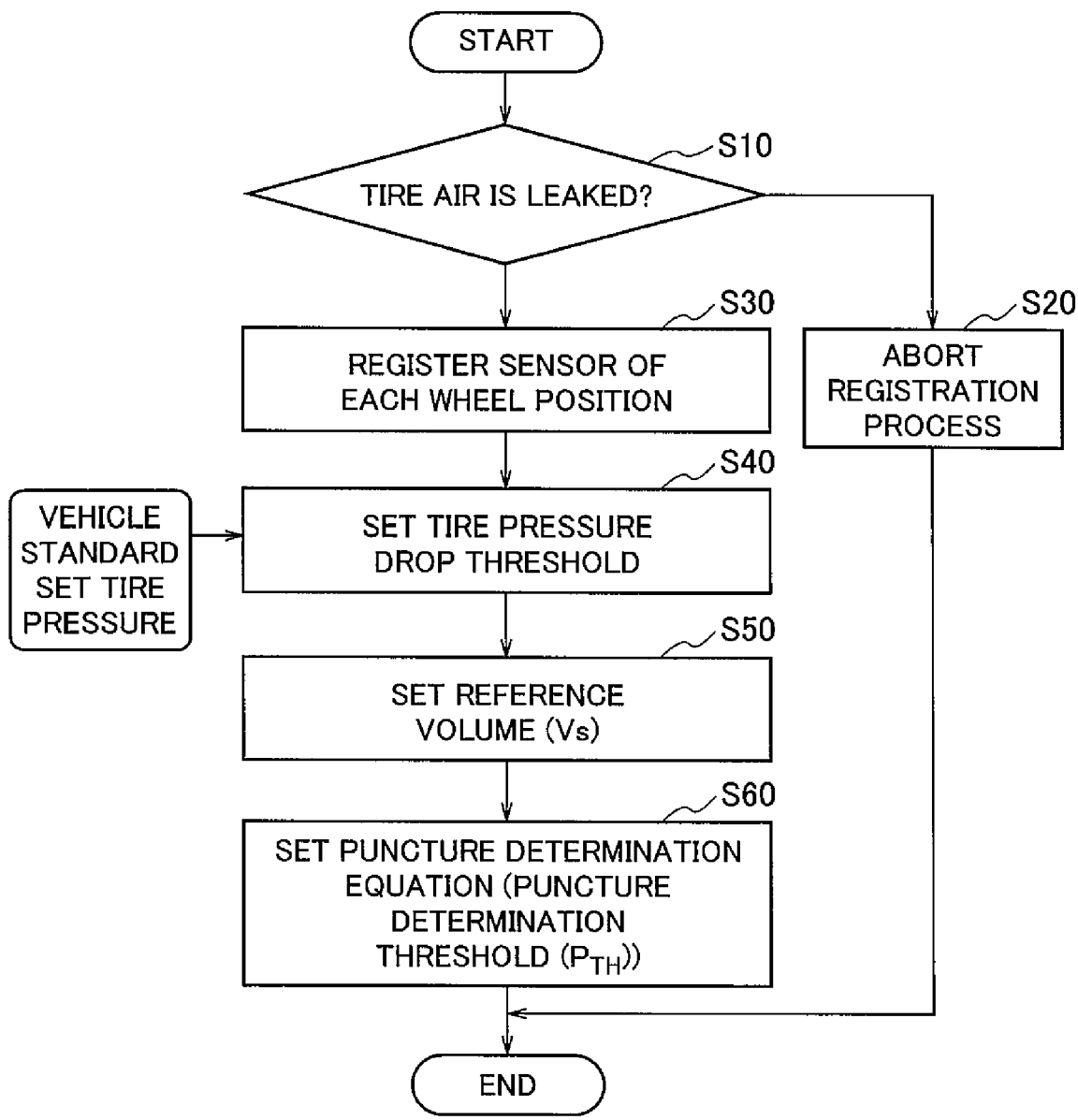
FIG. 3 is a flow chart illustrating a flow of an initial setting operation of the tire pressure monitoring system 30.

FIG. 3 is a flow chart illustrating a flow of the initial setting operation of the tire pressure monitoring system 30. As shown in FIG. 3, at first, an operator (user) of the tire pressure monitoring system 30 checks the presence of the air leak of the tire 20FL, the tire 20FR, the tire 20RL, and the tire 20RR (S10). In case in which the air leak is found, the operator aborts a registration process and takes a countermeasure to the air leak (S20). This is because the reference volume Vs might fail to be calculated precisely in a case in which the air leak is generated.

Next, the operator registers the sensor 50FL, the sensor 50FR, the sensor 50RL, and the sensor 50RR mounted to the wheel positions (FL, FR, RL, and RR) (S30). Specifically, the operator registers the sensor ID of each sensor to be linked with the wheel position, in the tire pressure monitoring system 30. With this, the tire pressure monitoring system 30 (TPMS main unit 100) can determine that each sensor is located at which wheel position by the signal (data) output from each sensor.

Further, the operator sets the tire pressure drop threshold (S40). The tire pressure drop threshold is generally set based on the standard set tire pressure (for example, 230 kPa) of the vehicle 10 (for example, less than the standard set tire pressure).

Further, the operator sets the reference volume Vs (S50). Specifically, as the calculated tire pressure Pr is defined by the standard set tire pressure of the vehicle 10, the tire pressure monitoring system 30 calculates the reference volume Vs based on the calculated tire pressure Pr and the tire temperature T measured by the tire pressure monitoring system 30.

In a case in which the failure such as the air leak is not found, the reference volume Vs may be calculated by using the measured tire pressure P and the measured tire temperature T.

Further, the tire pressure monitoring system 30 sets the puncture determination equation (puncture determination threshold $P_{TH}$) in accordance with the equation 3 described above, based on the calculated tire pressure Pr corresponding to the set reference volume Vs (S60). For example, the calculated tire pressure Pr is set to 230 kPa, and the puncture determination threshold $P_{TH}$ is set to 0.8 or more of the calculated tire pressure Pr and 0.95 or less of the calculated tire pressure Pr.

After the initial setting operation of the tire pressure monitoring system 30 is finished, the puncture and the tire pressure drop can be detected.

(3. 2) Detection Operation of Puncture and Tire Pressure Drop

Figure 4:
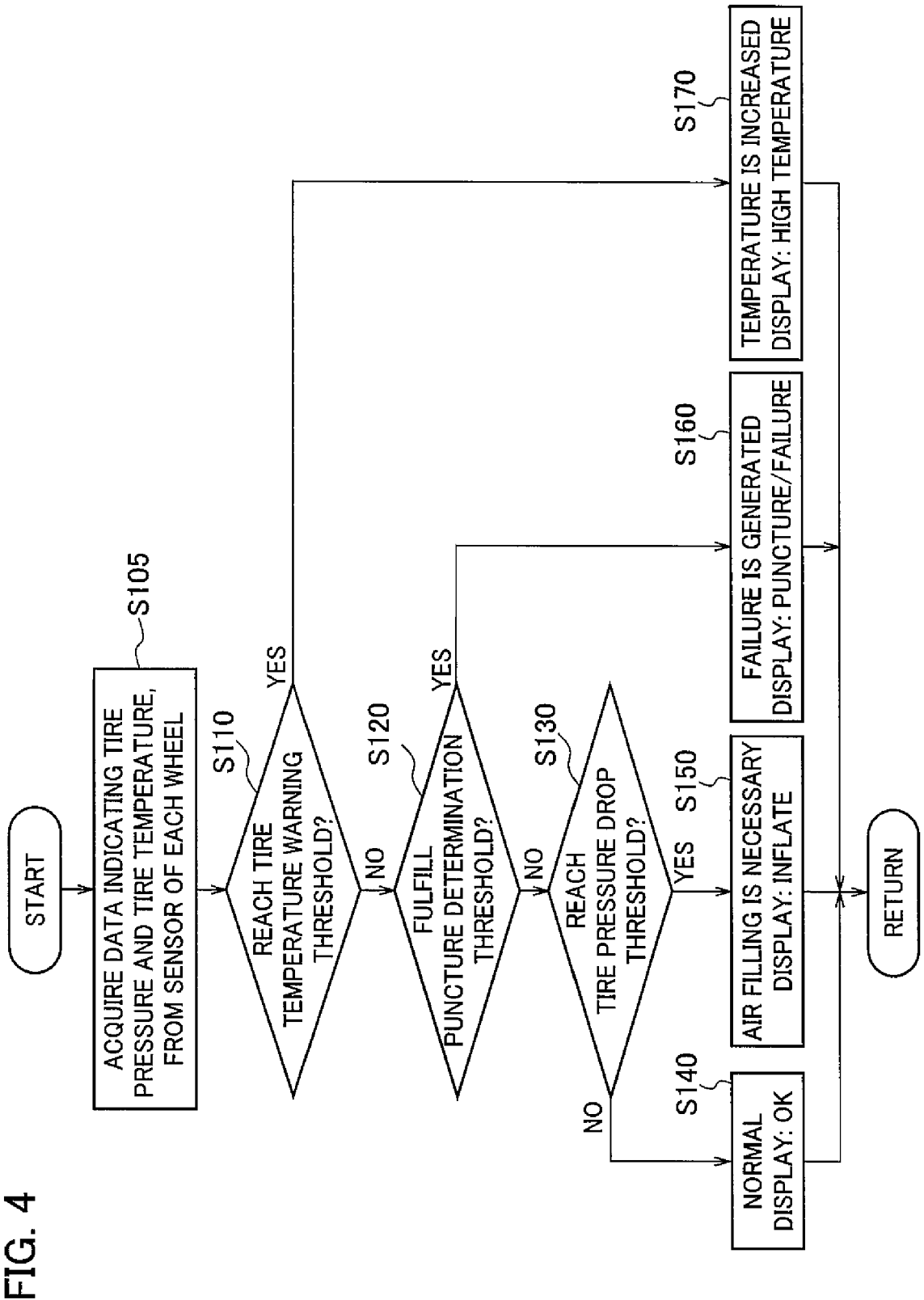
FIG. 4 is a flow chart illustrating a flow of a detection operation of a puncture and a tire pressure drop by the tire pressure monitoring system 30.
Figure 7A:
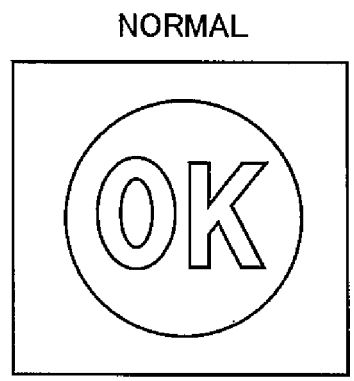
FIG. 7A is a view illustrating an image example 1 of a state of the tire displayed by a TPMS main unit 100.
Figure 7B:
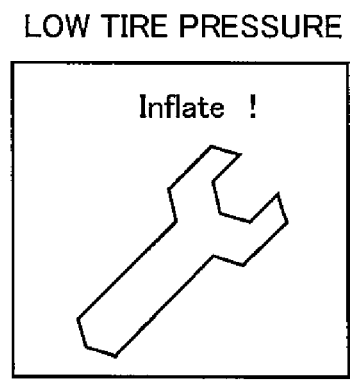
FIG. 7B is a view illustrating an image example 2 of a state of the tire displayed by the TPMS main unit 100.
Figure 7C:
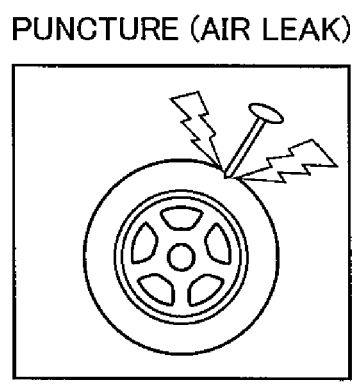
FIG. 7C is a view illustrating an image example 3 of a state of the tire displayed by the TPMS main unit 100.
Figure 7D:
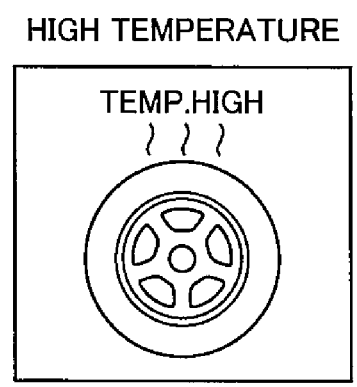
FIG. 7D is a view illustrating an image example 4 of a state of the tire displayed by the TPMS main unit 100.

FIG. 4 is a flow chart illustrating a flow of the detection operation of the puncture and the tire pressure drop by the tire pressure monitoring system 30. As shown in FIG. 4, the tire pressure monitoring system 30 acquires data indicating the tire pressure P and the tire temperature T from the sensor 50FL, the sensor 50FR, the sensor 50RL, and the sensor 50RR mounted to the wheel positions, respectively (S105).

The tire pressure monitoring system 30 determines whether the tire temperature T reaches the tire temperature warning threshold (S110). In a case in which the tire temperature T reaches the tire temperature warning threshold, the tire pressure monitoring system 30 displays the warning of "High temperature" as the temperature of the tire is increased (S170). For example, the tire pressure monitoring system 30 displays the image shown in FIG. 7D, on the display portion 111.

The tire pressure monitoring system 30 determines whether the tire pressure P fulfills the puncture determination threshold $P_{TH}$ (S120).

In a case in which the tire pressure P fulfills the puncture determination threshold $P_{TH}$, the tire pressure monitoring system 30 displays the warning of "Puncture/Failure" as the failure is generated (S160). For example, the tire pressure monitoring system 30 displays the image shown in FIG. 7C, on the display portion 111.

In a case in which the tire pressure P does not fulfill the puncture determination threshold $P_{TH}$, the tire pressure monitoring system 30 determines whether the tire pressure reaches the tire pressure drop threshold (S130). In a case in which the tire pressure P does not reach the tire pressure drop threshold, the tire pressure monitoring system 30 displays "OK" as a normal (S140). For example, the tire pressure monitoring system 30 displays the image shown in FIG. 7A, on the display portion 111.

In a case in which the tire pressure P reaches the tire pressure drop threshold, specifically, the tire pressure monitoring system 30 determines whether the tire pressure P is less than the puncture determination threshold $P_{TH}$ at the measured tire temperature T, namely the measured tire pressure P reaches the puncture determination threshold $P_{TH}$ (for example, 0.8 or more of the calculated tire pressure Pr and 0.95 or less of the calculated tire pressure Pr), which is set based on the calculate tire pressure Pr as shown in FIG. 6.

In a case in which the tire pressure P does not fulfill the puncture determination threshold $P_{TH}$, the tire pressure monitoring system 30 displays the warning of "Inflate" as the air should be filled (S150). For example, the tire pressure monitoring system 30 displays the image shown in FIG. 7B, on the display portion 111.

(3. 3) Correction of Measurement Error of Sensor

Next, correction of the measurement error of the sensor will be described. Each of the sensor 50FL, the sensor 50FR, the sensor 50RL, and the sensor 50RR has its individual measurement error (instrumental error). It is preferable that the error of the temperature and the pressure (inner pressure) measured by the sensor is corrected to improve the accuracy of the puncture determination.

Figure 8A:
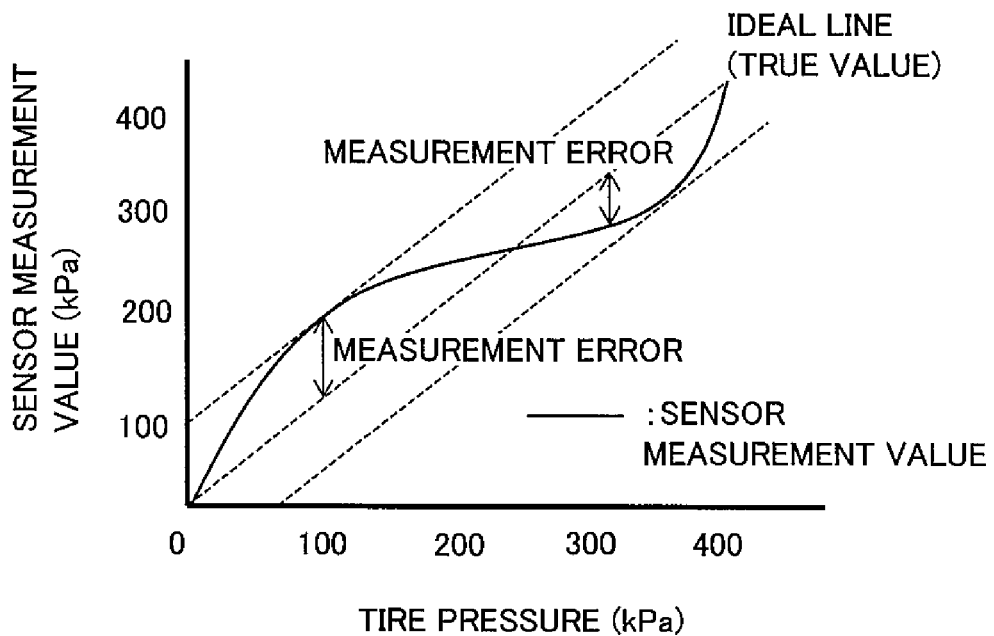
FIG. 8A is a graph illustrating an example of a measurement error (pressure variation) of the sensor.
Figure 8B:
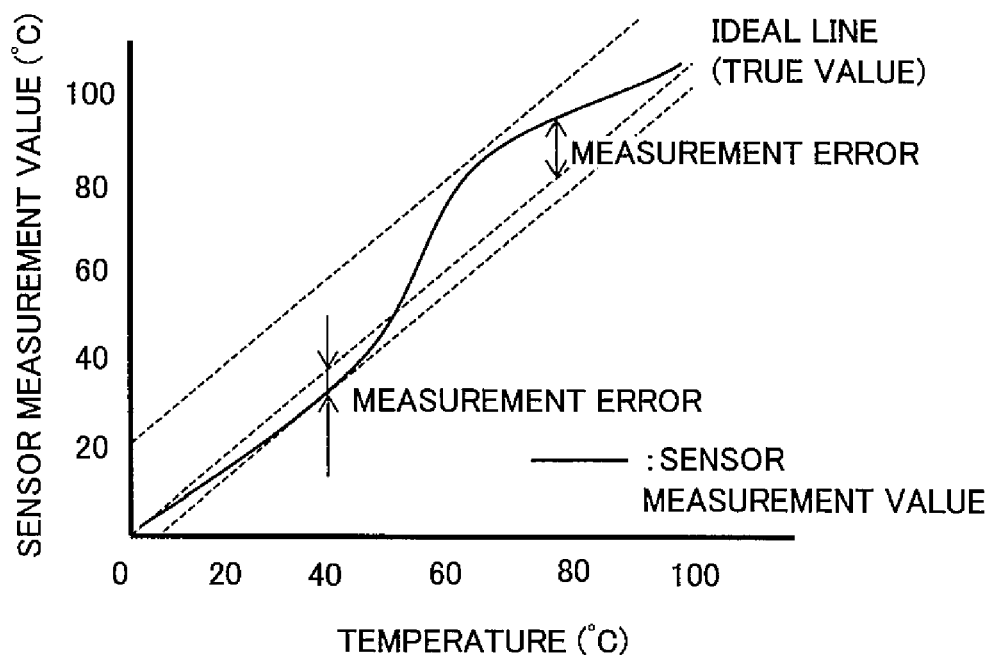
FIG. 8B is a graph illustrating an example of a measurement error (temperature variation) of the sensor.

FIG. 8A and FIG. 8B show examples of the measurement error of the sensor. Specifically, FIG. 8A is a graph illustrating an example of the measurement error of the pressure measured by the sensor (pressure sensor 53). FIG. 8B is a graph illustrating an example of the measurement error of the temperature measured by the sensor (pressure sensor 51).

As shown in FIG. 8A and FIG. 8B, the measurement value (pressure and temperature) of the sensor includes an error having a certain tendency against an ideal line (true value). That is, there is the reproducibility of such an error for each sensor. Thus, in the present embodiment, the tire pressure monitoring system 30 (puncture determination portion 103) corrects the error by using an nth-degree equation approximated to an actual measurement value of the sensor or by using a table that links the true value with the measurement value of the sensor, for each of the sensor 50FL, the sensor 50FR, the sensor 50RL, and the sensor 50RR.

(4) Functions and Effects

According to the embodiment described above, the following functions and effects are obtained. Specifically, the tire pressure monitoring system 30 determines whether the tire is punctured, based on the puncture determination threshold $P_{TH}$ defined by the relationship between the tire pressure P and the tire temperature T measured by the sensor 50FL, the sensor 50FR, the sensor 50RL, and the sensor 50RR. Further, in a case in which it is determined that the tire is punctured, the tire pressure monitoring system 30 generates the warning indicating that the tire is punctured at an earlier stage than the warning indicating the drop of the tire pressure P.

Further, in the present embodiment, the tire pressure monitoring system 30 determines whether the tire is punctured, based on the puncture determination threshold $P_{TH}$ defined by the reference volume Vs calculated by using the reference tire pressure Ps and the reference tire temperature Ts. More specifically, the tire pressure monitoring system 30 determines that the tire is punctured, when the tire pressure P measured by the sensor 50FL, the sensor 50FR, the sensor 50RL, and the sensor 50RR fulfills the puncture determination threshold $P_{TH}$ linked to the tire temperature T at the measurement timing, namely when tire pressure P is less than the puncture determination threshold $P_{TH}$.

That is, since the puncture is not determined by the mere drop of the tire pressure P but determined based on the puncture determination threshold $P_{TH}$ defined by the reference volume Vs, the puncture, which is caused by the leak of the air filled in the tire 20FL, the tire 20FR, the tire 20RL, and the tire 20RR, can be detected precisely as soon as possible, while distinguishing the natural leak (natural drop of the air) of the tire pressure P, which is caused by the change of the outer air temperature or the like, from the puncture.

Such an early and precise detection of the puncture is based on the fact that, in a case in which the tire inner volume determined in advance as a reference is set as the reference volume Vs, the tire inner volume V is largely changed due to generation of the leak of the air in the tire. That is, even if the drop amount of the tire pressure P is very small, the generation of the puncture can be determined by linking the change amount of the tire inner volume V due to the air leak with the change amount (drop amount) of the tire pressure P at the measured tire temperature T.

On the other hand, the drop of the tire pressure P due to the natural air leak proceeds more slowly than that due to the puncture, and therefore the puncture can be distinguished from the drop of the tire pressure P due to the natural air leak.

In the present embodiment, when the tire pressure monitoring system 30 determined that either of the tire 20FL, the tire 20FR, the tire 20RL, and the tire 20RR (hereinafter, merely referred to as tire as needed) is punctured, the tire pressure monitoring system 30 generates the warning indicating that the tire is punctured apart from the drop of the tire pressure (tire pressure drop threshold).

With this, a driver of the vehicle 10 or the like is promoted to repair the puncture as soon as possible. In particular, in a case of the slow puncture in which the pressure gradually drops due to the air leak caused by a sharp object such as a nail stuck into the tire, the driver is apt to determine it as the natural air leak and to neglect the inspection of the tire. However, such an action of the driver can be avoided. Accordingly, it can be prevented that the tire is damaged severely by leaving the slow puncture.

In the present embodiment, the puncture determination threshold $P_{TH}$ is set to 0.8 or more of the calculated tire pressure Pr (reference tire pressure) linked to the set tire temperature Tr (reference tire temperature) and 0.95 or less of the calculated tire pressure Pr, and therefore the puncture determination threshold $P_{TH}$ is more than the tire pressure drop threshold (for example, less than 0.8 of the standard set tire pressure) used for determining the drop of the tire pressure P. Thus, it can be detected that the tire is punctured as soon as possible while distinguishing the drop of the tire pressure (tire pressure drop threshold).

In the present embodiment, the correction coefficient $k_T$ for the tire temperature (specifically, the reference tire temperature Ts and the set tire temperature Tr) and the correction coefficient $k_P$ for the tire pressure (specifically, the reference tire pressure Ps and the calculated tire pressure Pr) are adopted. Specifically, the reference volume Vs or the like can be calculated by using the equations 1 to 3 described above.

With this, the reference volume Vs having high accuracy used for determining the puncture can be set while considering the measurement accuracy of the sensor and the type of the tire.

In the present embodiment, the tire pressure monitoring system 30 sets the reference volume Vs based on the tire pressure P and the tire temperature T of the tire without the air leak and sets the puncture determination threshold $P_{TH}$ linked to the set reference volume Vs. Thus, when the reference volume Vs is calculated by using the measured tire pressure P and the measured tire temperature T, the reference volume Vs can be precisely calculated.

In the present embodiment, the tire pressure monitoring system 30 determines whether the air leak of the tire is not generated, based on the change of the tire pressure P of the tire with the air filled after the puncture is repaired. That is, in a case in which the tire pressure P of the tire with the air filled is more than the puncture determination threshold $P_{TH}$ according to the detection operation flow of the puncture and tire pressure drop shown in FIG. 4, it is determined that the puncture is repaired.

In particular, in a case in which a tire puncture emergency repair kit that fills the puncture repair liquid in the tire is used, it can be determined immediately whether a puncture hole is sealed by the puncture repair liquid. Accordingly, it is not necessary to check the tire pressure by using a compressor or an air gauge after the puncture repair liquid is filled.

In the present embodiment, the tire pressure monitoring system 30 determines whether the tire is punctured, by using either of the tire pressure (the tire pressure P or the calculated tire pressure Pr (specifically, $Pr^v$)) in which the measurement error of the sensor 50FL, the sensor 50FR, the sensor 50RL, and the sensor 50RR is corrected, and the tire temperature (the tire temperature T or the set tire temperature Tr) in which the measurement error (instrumental error) of the sensors is corrected.

With this, even in a case in which the sensor has a certain tolerance (instrumental error), the determination accuracy of the puncture can be further improved.

(5) Other Embodiments

As described above, the contents of the present invention are described with reference to the examples, however the present invention is not limited to those descriptions. It is obvious for a person skilled in the art to adopt various modifications and improvement.

For example, in the embodiment described above, the TPMS main unit 100 is mounted to the vehicle 10, however, the functions achieved by the TPMS main unit 100 may be provided at an outside of the vehicle 10.

Figure 9:
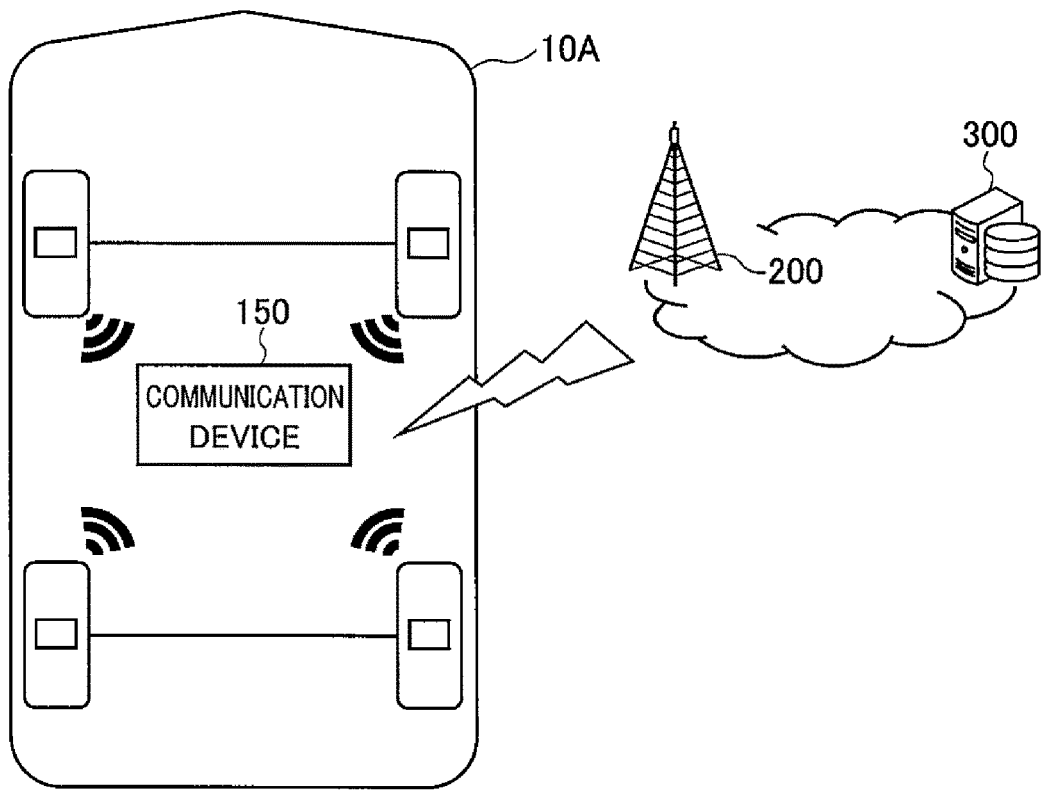
FIG. 9 is a schematic network configuration view including a schematic plane view of a vehicle 10A according to other embodiment.

FIG. 9 is a schematic network configuration view including a schematic plane view of a vehicle 10A according to other embodiment. As shown in FIG. 8, the vehicle 10A is provided with a communication device 150 instead of the TPMS main unit 100. The vehicle 10A is formed as a so-called connected car that can be connected to a server computer 300 via the communication network. The communication device 150 may be formed as a part of a so-called telematics unit.

The communication device 150 can execute radio communication with a radio base station 200. The communication device 150 is formed by, for example, a radio communication terminal connectable to a mobile communication network (LTE or the like).

The server computer 300 (database site) is arranged on the communication network so as to achieve a whole or a part of the functions (the data acquisition portion 101, the puncture determination portion 103, the warning processing portion 105, the volume setting portion 107, and the threshold setting portion 109), which are achieved by the TPMS main unit 100.

Further, a program (software) that achieves the functions may be stored on the communication network in a downloadable state, or may be provided by a storage medium in which the program is stored.

Further, in the embodiments described above, the vehicle 10 having four wheels is described as an example, however the present invention may be applied to other types of vehicle.

Figure 10:
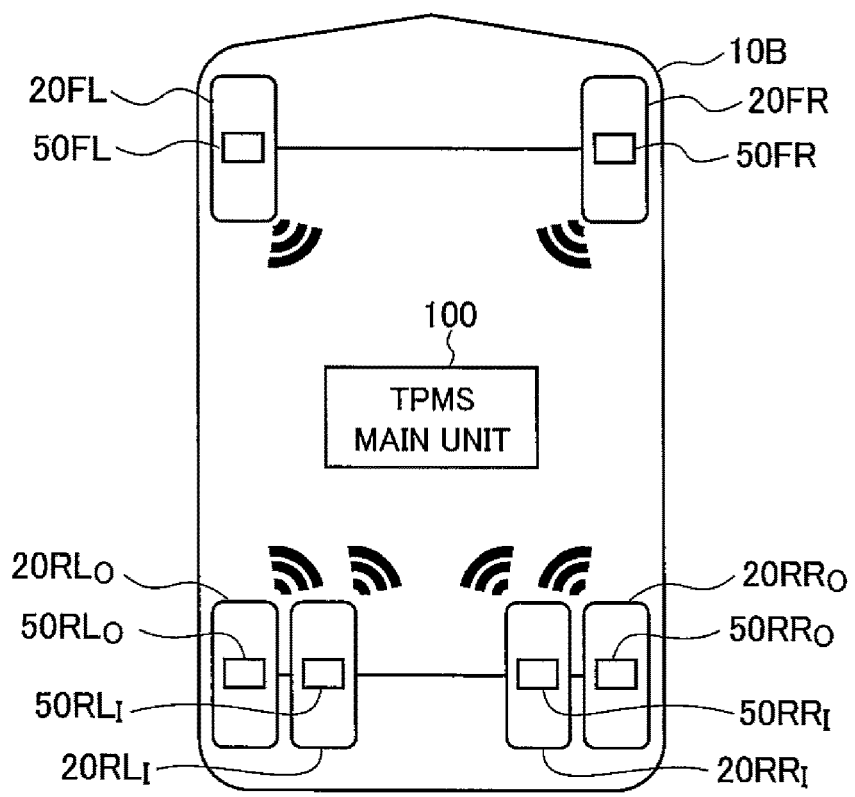
FIG. 10 is a schematic plane view of a vehicle 10B according to another embodiment.

FIG. 10 is a schematic plane view of a vehicle 10B according to another embodiment. As shown in FIG. 9, the vehicle 10B has a rear axle different from that of the vehicle 10. Specifically, a so-called double tire is mounted to the rear axle of the vehicle 10B, namely the vehicle 10B is formed as a large vehicle such as a truck and a mine vehicle.

The vehicle 10B includes a tire 20RL$_O$ (left rear outer wheel), a tire 20RL$_I$ (left rear inner wheel), a tire 20RR$_O$ (right rear outer wheel), and a tire 20RR$_I$ (right rear inner wheel) as rear tires. Further, a sensor 50RL$_O$, a sensor 50RL$_I$, a sensor 50RR$_O$, and a sensor 50RR$_I$ are mounted to the tire 20RL$_O$, the tire 20RL$_I$, the tire 20RR$_O$, and the tire 20RR$_I$, respectively.

The TPMS main unit 100 receives a radio signal from each sensor of two front wheels and four rear wheels. The number of the axles of the vehicle and the number of the wheels of the vehicle are not limited to those of the vehicle 10 and the vehicle 10B. For example, a tractor or a trailer having much more axles and wheels may be adopted.

As described above, the embodiments of the present invention are described, however the present invention is not limited to the description and the drawings forming a part of the present disclosure. Various modifications, examples, and operation techniques will be apparent from the present disclosure to a person skilled in the art.

INDUSTRIAL APPLICABILITY

The tire pressure monitoring system, the tire pressure monitoring method, the tire pressure monitoring program and the vehicle described above are useful to precisely detecting the puncture, which is caused by the leak of the air filled in the tire, as soon as possible while distinguishing the natural drop of the tire pressure, which is caused by the change of the outer air temperature or the like, from the puncture.

REFERENCE SIGNS LIST 10, 10A, 10B: vehicle
20FL, 20FR, 20RL, 20RR, 20RL$_I$, 20RL$_O$, 20RR$_I$, 20RR$_O$: tire
30: tire pressure monitoring system
50FL, 50FR, 50RL, 50RR, 50RL$_I$, 50RL$_O$, 50RR$_I$, 50RR$_O$: sensor
51: temperature sensor
53: pressure sensor
55: sensor ID setting portion
57: transmitter
90: receiver
100: TPMS main unit
101: data acquisition portion
103: puncture determination portion
105: warning processing portion
107: volume setting portion
109: threshold setting portion
111: display portion
150: communication device
200: radio base station
300: server computer

The invention claimed is:

1. A tire pressure monitoring system that monitors a tire pressure of a tire mounted to a vehicle, the tire pressure monitoring system comprising:
    a receiver that acquires data indicating the tire pressure and a tire temperature of the tire, from a sensor mounted to the tire; and
    a processor that determines whether the tire is punctured, based on a puncture determination threshold defined by reference volume calculated by using a reference tire pressure, a reference tire temperature, the tire pressure acquired by the receiver, and the tire temperature acquired by the receiver,
    wherein the processor determines that the tire is punctured, when the tire pressure is less than the tire puncture determination threshold linked to the tire temperature,
    wherein the reference volume Vs is calculated by Formula 1 using the reference tire pressure Ps, the reference tire temperature Ts, the tire pressure P, the tire temperature T, the correction coefficient k$_T$ for the tire temperature, and the correction coefficient k$_P$ for the tire pressure.

Formula 1
$$Vs = \frac{Ts}{Ps} = \frac{(273.15 + T + k_T)}{(P + k_P)}$$

2. The tire pressure monitoring system according to claim 1, wherein the processor generates a warning indicating that the tire is puncture apart from a drop of the tire pressure, when the processor determines that the tire is punctured.

3. The tire pressure monitoring system according to claim 1, wherein the puncture determination threshold is set to be 0.8 or more of the reference tire pressure linked to the reference tire temperature and 0.95 or less of the reference tire pressure, and the puncture determination threshold is more than a tire pressure drop threshold used for determining the drop of the tire pressure.

4. The tire pressure monitoring system according to claim 1, wherein the reference tire temperature is defined by using a correction coefficient corresponding to at least one of measurement accuracy of the sensor and a type of the tire.

5. The tire pressure monitoring system according to claim 1, wherein the reference tire pressure is defined by using a correction coefficient corresponding to at least one of measurement accuracy of the sensor and a type of the tire.

6. The tire pressure monitoring system according to claim 1, wherein the processor sets the reference volume and the puncture determination threshold,
    wherein:
    the processor sets the reference volume based on the tire pressure and the tire temperature of the tire without air leak; and
    the processor sets the puncture determination threshold linked to the reference volume set by the volume setting portion.

7. The tire pressure monitoring system according to claim 2, wherein the puncture determination threshold is set to be 0.8 or more of the reference tire pressure linked to the reference tire temperature and 0.95 or less of the reference tire pressure, and the puncture determination threshold is more than a tire pressure drop threshold used for determining the drop of the tire pressure.

8. The tire pressure monitoring system according to claim 2, wherein the reference tire temperature is defined by using a correction coefficient corresponding to at least one of measurement accuracy of the sensor and a type of the tire.

9. The tire pressure monitoring system according to claim 3, wherein the reference tire temperature is defined by using a correction coefficient corresponding to at least one of measurement accuracy of the sensor and a type of the tire.

10. The tire pressure monitoring system according to claim 2, wherein the reference tire pressure is defined by using a correction coefficient corresponding to at least one of measurement accuracy of the sensor and a type of the tire.

11. The tire pressure monitoring system according to claim 3, wherein the reference tire pressure is defined by using a correction coefficient corresponding to at least one of measurement accuracy of the sensor and a type of the tire.

\* \* \* \* \*